United States Patent
Tsai et al.

(10) Patent No.: US 7,592,292 B2
(45) Date of Patent: Sep. 22, 2009

(54) CATALYST FOR USE IN REFORMING METHANOL WITH STEAM AND METHOD FOR PREPARATION THEREOF

(75) Inventors: An-Pang Tsai, Tsukuba (JP); Satoshi Kameoka, Tsukuba (JP); Masami Terauchi, Sendai (JP)

(73) Assignees: Japan Science Technology Agency, Kawaguchi-shi (JP); National Institute for Materials Science, Tsukuba-shi (JP)

( * ) Notice: Subject to any disclaimer, the term of this patent is extended or adjusted under 35 U.S.C. 154(b) by 552 days.

(21) Appl. No.: 10/566,207

(22) PCT Filed: Jul. 28, 2004

(86) PCT No.: PCT/JP2004/010738

§ 371 (c)(1),
(2), (4) Date: Jan. 27, 2006

(87) PCT Pub. No.: WO2005/009612

PCT Pub. Date: Feb. 3, 2005

(65) Prior Publication Data

US 2008/0058202 A1    Mar. 6, 2008

(30) Foreign Application Priority Data

Jul. 29, 2003    (JP) ............................. 2003-203230
Sep. 17, 2003    (JP) ............................. 2003-325350

(51) Int. Cl.
*B01J 23/70* (2006.01)
*B01J 23/02* (2006.01)
*B01J 23/00* (2006.01)
*B01J 21/00* (2006.01)

(52) U.S. Cl. ..................... 502/346; 502/100; 502/300; 502/344; 502/345

(58) Field of Classification Search ................... None
See application file for complete search history.

(56) References Cited

FOREIGN PATENT DOCUMENTS

| JP | 402233501 | * | 9/1990 |
|----|-----------|---|--------|
| JP | 3-238049  |   | 10/1991 |
| JP | 7-126702  |   | 5/1995 |

(Continued)

OTHER PUBLICATIONS

A.P. Tsai et al., "Highly active quasicrystalline Al-Cu-Fe catalyst for steam reforming of methanol", Applied Catalysis A: General 214 (2001) 237-241.

(Continued)

*Primary Examiner*—Melvin C Mayes
*Assistant Examiner*—Sarah Van Oudenaren
(74) *Attorney, Agent, or Firm*—Westerman, Hattori, Daniels & Adrian, LLP

(57) ABSTRACT

A method of manufacturing a copper-based catalyst having high activity and superior heat resistance and a catalyst used for steam reforming of methanol has Al alloy particles each having an oxide surface layer containing fine copper oxide particles. The Al alloy particles are produced by leaching Al alloy particles with an aqueous solution. The Al alloy particles are prepared by pulverizing a bulky Al alloy having a quasicrystalline phase, the quasicrystalline phase being represented by the formula $Al_{100-y-z}Cu_yTM_z$ (where y is 10 to 30 atomic percent, z is 5 to 20 atomic percent, and TM indicates at least one of transition metals other than Cu). In the catalyst, the oxide surface layer containing fine copper oxide particles is formed by adjusting leaching conditions so as to form an oxide surface layer, which contains dispersed fine Cu particles and which is composed of an Al oxide and a transition metal oxide, on the surface of each of the Al alloy particles. The leached Al alloy particles are heat treated in an oxidizing atmosphere, whereby some or all of the fine Cu particles contained in the oxide surface layer are converted into the fine copper oxide particles.

4 Claims, 5 Drawing Sheets

FOREIGN PATENT DOCUMENTS

| | | |
|---|---|---|
| JP | 7-178342 | 7/1995 |
| JP | 7-265704 | 10/1995 |
| JP | 2001-276625 | 10/2001 |

OTHER PUBLICATIONS

M. Yoshimura et al., "Quasicrystal application on catalyst", Journal of Alloys and Compounds 342 (2002) pp. 451-454.

Michiaki Yamasaki et al., "Oxidation behavior of quasicrystalline $Al_{63}Cu_{25}Fe_{12}$ alloys with additional elements", Journal of Alloys and Compounds 342 (2002) pp. 473-476.

Satoshi Kameoka, "Steam Reforming Reaction of Methanol using Quasi-crystalline Metal Catalyst", Shokubai, Mar. 10, 2003, vol. 45, No. 2, pp. 138-140.

* cited by examiner

Heating Treatment in Oxidizing Atmosphere

US 7,592,292 B2

CATALYST FOR USE IN REFORMING METHANOL WITH STEAM AND METHOD FOR PREPARATION THEREOF

TECHNICAL FIELD

The present invention relates to a copper-based catalyst used for manufacturing hydrogen by steam reforming of methanol and a method for manufacturing the copper-based catalyst.

BACKGROUND ART

A copper-based catalyst has been widely used for stream reforming of methanol, methanol synthesis, water-gas shift reaction, hydrogenaration and hydrocracking of organic compounds, and the like. However, in general, since a copper-based catalyst has very inferior heat resistance and durability, conditions for the use thereof have been often limited.

As a method in which fine Al alloy particles are used as a carrier of a copper-based catalyst, a method for manufacturing a catalyst used for steam reforming of methanol has been known (Patent Document 1) in which a melt of an Al—Cu-based alloy (5 to 20 atomic percent of Cu and 4 to 18 atomic percent of at least one alloy element selected from the group consisting of a rare earth element, Fe, Mn, Pd, Co, V, Ag, and Pt) is quenched and solidified to form a ribbon-shaped raw material, followed by decomposition thereof by leaching treatment using acid or alkali into powdered particles, so that the surface layers thereof have a mixed phase composed of innumerable ultrafine copper-based particles and innumerable ultrafine alloy element particles.

In Patent Document 1, as a metal structure of the Al alloy, for example, there may be mentioned an Al supersaturated solid-solution single phase structure, quasicrystalline single phase structure, mixed phase structure of a fine Al crystalline phase and a quasicrystalline phase, mixed phase structure of a fine Al crystalline phase and a fine Al-based intermetallic compound phase, amorphous single phase structure, mixed phase structure of an amorphous phase and a fine Al crystalline phase, and mixed phase structure of an amorphous phase, a fine Al crystalline phase, and a fine Al-based intermetallic compound phase.

In addition, it has been known that quasicrystalline ultrafine Al alloy particles have a high activity in a methanol decomposition reaction (Patent Document 2), and as the above quasicrystalline ultrafine Al alloy, for example, there may be mentioned an Al—Pd(20 to 30 atomic percent) alloy, Al—Cu(18 to 23 atomic percent) —Fe(13 to 15 atomic percent) alloy, Al—Cu(15 to 20 atomic percent) —Co(15 to 20 atomic percent) alloy, Al—Ni(10 to 15 atomic percent) —Co (15 to 20 atomic percent) alloy, Al—Pd(15 to 30 atomic percent)-transition metal(17 atomic percent or less) alloy, Al—Pd(15 to 30 atomic percent)-transition metal(17 atomic percent or less) —B(10 atomic percent or less) alloy, and Al—V(13 to 17 atomic percent) —Cu(15 to 20 atomic percent) alloy.

Furthermore, the inventors of the present invention developed a method for manufacturing a catalyst used for steam reforming of methanol in which a quasicrystalline Al alloy ingot composed of Al, Cu and at least one metal atom selected from the group consisting of Fe, Ru, and Os is pulverized, and alloy particles thus obtained are etched with an aqueous sodium hydroxide solution (Patent Document 3, Non-Patent Documents 1, 2, and 3).

Non-Patent Document 1: Applied catalysis A: General 214, (2001), 237 to 241

Non-Patent Document 2: Journal of Alloys and Compounds 342, (2002), 451 to 454

Non-Patent Document 3: Journal of Alloys and Compounds 342, (2002), 473 to 476

Patent Document 1: Japanese Unexamined Patent Application Publication No. 7-265704 (Japanese Patent No. 3382343)

Patent Document 2: Japanese Unexamined Patent Application Publication No. 7-126702

Patent Document 3: Japanese Unexamined Patent Application Publication No. 2001-276625

DISCLOSURE OF INVENTION

Problems to be Solved by the Invention

In all conventional so-called copper-based catalysts, fine copper particles are supported on oxide surfaces or metal surfaces and are used as active sites for catalytic reaction. When the catalysts described above are heated to a high temperature (300° C.), fine copper particles become coarse by sintering, and the surface area of copper is considerably decreased, resulting in decrease in activity.

As for the catalyst according to the invention disclosed in Patent Document 1 (Japanese Unexamined Patent Application Publication No. 7-265704), in the case in which NaOH is used for an aqueous alkaline solution, the catalyst is obtained by decomposition of a ribbon-shaped raw material, the decomposition being performed by immersing the above raw material in an alkaline solution at a NaOH concentration of 20 to 30 percent by weight for an immersion time of 1 to 30 minutes. Since ultrafine particles of a rare earth element, transition metal, noble metal, or the like are uniformly dispersed so as to prevent coarsening of the catalyst which is caused by sintering at a high temperature, the heat resistance of the catalyst is improved; however, the heat resistance cannot be further improved at a temperature of 300° C. or more in all the cases.

Since the catalyst according to the invention disclosed in Patent Document 2 (Japanese Unexamined Patent Application Publication No. 7-126702) is fabricated by a liquid quenching method, the cost is high, and the yield of materials is low. In addition, since the phases obtained thereby are unstable which transform at a high temperature. Although the activity can be retained up to approximately 300° C., the thermal stability is not superior. Furthermore, an aqueous HCl solution is used to perform leaching where in addition to Al, a large amount of a transition metal is also leached out from this catalyst. The catalyst according to the invention disclosed in Patent Document 3 (Japanese Unexamined Patent Application Publication No. 2001-276625) has a high activity; however, the activity cannot be further improved at a temperature of 320° C. or more, and the thermal stability is not satisfactory.

Subsequently, the inventors of the present invention developed a catalyst having a high activity, and high thermal stability, and superior durability and a manufacturing method thereof, the catalyst being composed of composite particles in which Cu nanoparticles and Co nanoparticles are uniformly dispersed and tightly fixed onto surfaces of particles obtained from a quasicrystalline Al alloy used as a precursor, and the patent application of the above invention was filed (Japanese Patent Application No. 2003-60574).

In addition, ultrafine compound catalyst particles supported on a carrier made of quasicrystalline Al alloy particles were developed, and the patent application thereof was filed (Japanese Patent Application No. 2003-88648), the ultrafine compound catalyst particles being formed from ultrafine metal particles, which are formed on surfaces of the quasicrystalline Al alloy particles, and another metal element.

Since many catalytic reactions proceed at a high temperature, the thermal stability and durability are required. For example, when a compound is used as a catalyst of a fuel cell which requires thermal stability, in particular, the thermal stability and the durability of the compound become important. Most catalysts other than copper-based catalysts are formed using a noble metal and hence are not practical from a cost point of view.

An object of the present invention is to provide a copper-based catalyst having superior heat resistance and durability to those of copper-based catalysts which were developed in the past, and to provide a manufacturing method of the above catalyst which can be performed at a low cost by a process that is improved as simple as possible.

Means for Solving the Problems

The following were first found by the inventors of the present invention. That is, a catalyst made of fine composite particles containing transition metal particles and Cu particles has high activity, high heat resistance, and superior durability in steam reforming reaction of methanol, the composite particles being obtained by pulverizing a quasicrystalline Al alloy such as AlCuFe or AlCuCo, followed by leaching treatment, and the above catalyst can be easily manufactured by pulverizing the above quasicrystalline Al alloy, followed by leaching treatment using an alkaline solution.

By performing leaching treatment for a quasicrystalline Al alloy containing Cu, thin films formed on particle surfaces are removed, and in addition, fine copper particles can also be precipitated on the surfaces by leaching out aluminum. A hydrogen generation amount per gram, which is an indication of the activity in a steam reforming reaction of methanol, of a quasicrystalline AlCuFe catalyst obtained by leaching treatment using an aqueous $Na_2CO_3$ solution is up to 400 ml/min at 360° C. Furthermore, as the temperature is increased to 360° C., the hydrogen generation amount is being increased, and hence the above catalyst has a high heat resistance that cannot be obtained by a conventional Cu-based catalyst.

According to powder X-ray diffraction pattern for a sample before and after the steam reforming reaction, apparent diffraction peaks of copper or copper oxides were not observed, and hence the measurement result indicated that no sintering of Cu particles occurred. FIG. 1 includes conceptual views each showing a surface structure of a catalyst particle in a process for manufacturing the catalyst of the present invention. By detailed investigation, it became clear that this catalyst is formed as shown in the conceptual view of FIG. 1(A). When an aqueous $Na_2CO_3$ solution was used in the leaching treatment, a surface of an Al alloy quasicrystal 1 was processed by the leaching treatment, and at the same time, an oxide surface layer 2 having a cotton candy-shaped network structure was formed on the surface.

The oxide surface layer 2 having a cotton candy-shaped network structure is formed of oxides and hydroxides of Al and oxides of Fe and Co and has a significantly large surface area, and in the surface layer described above, Cu particles 3 having an average particle diameter of approximately 5 nm are dispersively present. Also at the interface of the quasicrystal, Cu particles are primarily dispersed. As a result, Cu nanoparticles are distributed highly dispersively at a high density, and hence a high activity can be obtained. In addition, the network-shaped oxide surface layer 2 prevents sintering of the Cu particles 3, and as a result, a high heat resistance can be obtained.

However, it was found that this network-shaped oxide surface layer 2 is not always stable and may be decomposed or transformed at a high temperature in a steam atmosphere. The inventors of the present invention found that when heat treatment, that is, calcination is further performed in an oxidizing atmosphere for a Cu-based catalyst which is formed as described above by using a quasicrystalline Al alloy as a precursor, the network-shaped oxide can be further stabilized, and hence a Cu-based catalyst having a high activity and high heat resistance can be obtained.

That is, when the Al alloy particles processed by the leaching treatment is heated in an oxidizing atmosphere, the oxide surface layer having a cotton candy-shaped network structure is changed so as to be slightly compressed, and as shown in the conceptual view in FIG. 1(B), some or all of the fine Cu particles 3 in the oxide surface layer 2 are formed into fine copper oxide particles 5, and Al oxide layer 4 is generated on the surface of the Al alloy quasicrystal 1. On the Al oxide layer 4, an integrated layer is formed in which oxide nanoparticles 6 of a transition metal as Fe or Co, and the Cu oxide nanoparticles 5 are dispersed. Furthermore, on the integrated layer described above, the network structure described above still remains.

That is, the present invention provides (1) a catalyst used for steam reforming of methanol which comprises Al alloy particles each having an oxide surface layer containing fine copper oxide particles, the Al alloy particles being produced by a process comprising the step of performing leaching treatment for Al alloy particles with an aqueous alkaline solution which are prepared by pulverizing a bulky Al alloy having a quasicrystalline phase or a related crystalline phase thereof, the quasicrystalline phase being represented by the formula: $Al_{100-y-z}Cu_yTM_z$ (where y is in the range of 10 to 30 atomic percent, z is in the range of 5 to 20 atomic percent, and TM indicates at least one of transition metals other than Cu). In the catalyst described above, the oxide surface layer containing fine copper oxide particles is formed by adjusting leaching conditions of the leaching treatment so as to form an oxide surface layer, which contains dispersed fine Cu particles and which is composed of an Al oxide and a transition metal oxide, on the surface of each of the Al alloy particles, followed by heat treatment of the leached Al alloy particles in an oxidizing atmosphere, whereby some or all of the fine Cu particles contained in the oxide surface layer are converted into the fine copper oxide particles.

In addition, according to (2) of the present invention, in the catalyst (1) used for steam reforming of methanol described above, the copper oxide in the surface oxide layer obtained by the heat treatment in an oxidizing atmosphere after the leaching treatment is CuO or a $Cu(TM_xAl_{1-x})_2O_4$ (0<x≦1.0) spinel compound.

In addition, according to (3) of the present invention, in the catalyst (1) or (2) used for steam reforming of methanol described above, in the surface oxide layer obtained by the heat treatment in an oxidizing atmosphere after the leaching treatment, an integrated layer composed of a Cu oxide and a transition metal (TM) oxide is formed in the vicinity of the interface with the Al alloy particle.

In addition, according to (4) of the present invention, in one of the catalysts (1) to (3) used for steam reforming of methanol described above, the TM is at least one element selected from the group consisting of Fe, Ru, Os, Co, Rh, and Ir.

In addition, according to (5) of the present invention, in one of the catalysts (1) to (3) used for steam reforming of methanol described above, the TM is at least one element selected from the group consisting of Mn, Re, Cr, Mo, W, V, Nb, and Ta.

In addition, the present invention provides (6) a catalyst used for steam reforming of methanol, which comprises a surface layer having a structure in which Cu nanoparticles having a particle diameter of 10 nm or less are surrounded by $Fe_3O_4$, $Al_2O_3$, or a mixture thereof, wherein the Cu nanoparticles are formed by reducing the CuO or the $Cu(Fe_xAl_{1-x})_2O_4$ ($0<x\leq1.0$) spinel compound according to the above (2).

In addition, according to (7) of the present invention, there is provided a method for manufacturing a catalyst used for steam reforming of methanol: comprising the steps of pulverizing a bulky Al alloy having a quasicrystalline phase or a related crystalline phase thereof, the quasicrystalline phase being represented by the formula: $Al_{100-y-z}Cu_yTM_z$ (where y is in the range of 10 to 30 atomic percent, z is in the range of 5 to 20 atomic percent, and TM indicates at least one of transition metals other than Cu), and performing leaching treatment for Al alloy particles formed in the pulverizing step with an aqueous alkaline solution. In the method described above, leaching conditions of the leaching treatment are adjusted to form oxide surface layers, which contain fine Cu particles dispersed therein and which are composed of an Al oxide and a transition metal oxide, on surfaces of the Al alloy particles, followed by heat treatment of the leached Al alloy particles in an oxidizing atmosphere so that some or all of the fine Cu particles are converted into fine copper oxide particles, whereby the catalyst used for steam reforming of methanol is manufactured so as to have Al alloy particles provided with oxide surface layers containing the fine copper oxide particles.

In addition, according to (8) of the present invention, in the method (7) for manufacturing a catalyst used for steam reforming of methanol described above, the copper oxide in the surface oxide layers obtained by the heat treatment in an oxidizing atmosphere after the leaching treatment is CuO or $Cu(Fe_xAl_{1-x})_2O_4$ ($0<X\leq1.0$) spinel compound.

In addition, according to (9) of the present invention, in the method (7) for manufacturing a catalyst used for steam reforming of methanol described above, the temperature of the aqueous alkaline solution is in the range of 40 to 90° C.

In addition, according to (10) of the present invention, in the method (7) for manufacturing a catalyst used for steam reforming of methanol described above, the aqueous alkaline solution is an aqueous solution containing one of sodium hydroxide (NaOH), sodium carbonate ($Na_2CO_3$), and sodium hydrogen carbonate ($NaHCO_3$), the concentration thereof being in the range of 2 to 15 percent by weight.

In addition, according to (11) of the present invention, in the method (7) for manufacturing a catalyst used for steam reforming of methanol described above, an amount leached out of the Al alloy particles by the leaching treatment using the aqueous alkaline solution is in the range of 0.5 to 40 percent by weight.

According to (12) of the present invention, there is provided a method for manufacturing a catalyst used for steam reforming of methanol, which comprises the step of reducing the CuO or the $Cu(TM_xAl_{1-x})_2O_4$ ($0<X\leq1.0$) spinel compound, according to the above (8), so that a surface layer is formed having a structure in which Cu nanoparticles having a particle diameter of 10 nm or less surrounded by $Fe_3O_4$, $Al_2O_3$, or a mixture thereof.

In general, in steam reforming of methanol, when the temperature is increased, since molecules become active, the activity is increased, and the hydrogen generation rate is also increased. However, when the temperature is further increased, and the time passes further, the catalytic activity is generally degraded due to sintering. In spite of the fact described above, the catalytic activity of the catalyst according to the present invention is advantageously increased linearly even at a temperature of 400° C. or more.

Although the reasons the heat resistance of the copper-based catalyst obtained by the method of the present invention, which is used as a catalyst of steam reforming of methanol, have not been clearly understood as of today, when Fe is used as the TM element, the reasons may be construed as follows.

(1) Owing to the leaching treatment, Cu particles having an average particle diameter of approximately 15 to 50 nm are dispersively present among oxide particles of Al and Fe on the surface of the Al alloy particle, and a cotton candy-shaped network oxide (pseudo $Al_2O_3$) having a significantly large surface area is formed. The catalytic activity in this state is low.

(2) Since the stability of this cotton candy-shaped network oxide is enhanced by calcination in an oxidizing atmosphere, Cu atoms remaining among particles of a transition metal element oxide or $Al_2O_3$ particles after the leaching treatment are converted into CuO particles and pulled out onto the surface. That is, it is believed that since being newly formed by the oxidation treatment, Cu nanoparticles are distributed highly dispersively at a high density, and as a result, a high activity can be obtained. In this step, when the oxidation is performed at a high temperature, such as 600° C. or more, a $Cu(TM_xAl_{1-x})_2O_4$ ($0<x\leq1.0$) spinel compound is formed.

(3) Furthermore, this $Cu(TM_xAl_{1-x})_2O_4$ ($0<x\leq1.0$) spinel compound is easily reduced at a relatively low temperature, such as approximately 240° C., and as a result, a surface layer is formed having a structure in which Cu nanoparticles having a very small particle diameter, such as approximately 10 nm or less, are surrounded by $Fe_3O_4$, $Al_2O_3$, or a mixture thereof. As a result, since the Cu nanoparticles are distributed highly dispersively at a high density, a high activity can be obtained. In addition, it is believed that since the network-shaped oxide prevents sintering of the Cu particles, a high heat resistance can be obtained.

(4) When the structure described above is reduced at a temperature of 400° C. or more, a structure in which the original Cu and Fe are both present is formed. Concomitant with this formation, the activity is decreased. An immiscible interaction between Cu and Fe at this point plays a very important role.

In order to verify the effect of oxidation in the calcination treatment, a catalyst which was once calcinated in an oxidizing atmosphere was heat-treated in a hydrogen atmosphere. As a result, a catalyst processed by reduction heat treatment at 400° C. or more in a hydrogen atmosphere forms a structure in which the original Cu and Fe are both present, and the activity thereof is decreased down to 30% of the activity of the catalyst obtained by heat treatment in the air. The degree of this activity is considerably low as compared to that of the catalyst obtained only by the leaching treatment. In addition, since this catalyst processed by reduction treatment contains both Cu and Fe, small particles having a predetermined size are present even after the reduction treatment. Hence, when calcination is again performed in the air, a uniform structure such as $Cu(TM_xAl_{1-x})_2O_4$ ($0<x\leq1.0$) can be obtained by oxidation, and the catalytic activity can be almost recovered. That is, reversible reaction occurs. From the result described above, it is apparent that the increase in activity by the firing is caused by oxidation. The same result as described above can also be obtained from a ω-AlCuFe and an AlCuCo quasicrystal.

Advantages

As apparent from the above description, when a Cu-based catalyst is further processed by calcination in an oxidizing atmosphere, the Cu-based catalyst being composed of composite particles in which Cu nanoparticles and transition metal nanoparticles are uniformly dispersed and tightly fixed on surfaces of Al alloy particles and being formed by performing leaching treatment with an aqueous alkaline solution for a powdered Al alloy as a precursor obtained by pulverizing a bulky Al alloy having a quasicrystalline or a related crystalline phase, the catalyst thus processed has a high activity approximately two times or more that of a catalyst which is not processed by calcinating treatment in an oxidizing atmosphere, and in addition, superior heat resistance and durability can also be obtained. In addition, since the catalyst of the present invention is easily manufactured by pulverization of an ingot formed by a common melt casting method, leaching treatment, and heat treatment in an oxidizing atmosphere, the manufacturing can be performed at a low cost using a simple process.

BEST MODE FOR CARRYING OUT THE INVENTION

A catalyst of the present invention is formed using an Al alloy as a precursor which is primarily composed of aluminum and copper. A first group of this Al alloy includes a quasicrystal represented by AlCuTM (TM=Fe, Ru, Os, Co, Rh, and Ir) and a related crystalline phase alloy thereof. A second group is a related crystalline phase alloy of a quasicrystal represented by AlCuTM (TM=Mn, Re, Cr, Mo, W, V, Nb, and Ta). The compositions of these Al alloys are represented on an atomic percent basis, and the content of copper and that of the TM element are preferably 10% to 30% and 5% to 20%, respectively. The content of aluminum is in the range of 50% to 85% and is more preferably in the range of 60% to 80%.

When the content of copper of the Al alloy is less than 10 atomic percent, since the amount of Cu particles responsible for catalytic activity is small, and hence high activity cannot be expected. On the other hand, when the content is more than 30 atomic percent, it is not preferable since sintering caused by Cu is liable to occur.

The TM element of the first group is an element forming a quasicrystal or a related crystalline phase thereof and forms oxide particles on the surface of the Al alloy particles. The related crystalline phase is not a quasicrystalline single phase and indicates a mixed phase structure containing an approximate crystal and/or another crystalline phase besides a quasicrystalline phase. For example, the catalytic activity is significantly improved in an Al—Cu-based intermetallic compound such as a crystalline compound (generally called a ω phase) represented by $Al_{70}Cu_{20}Fe_{10}$ having a composition close to that of a quasicrystal.

The TM element of the second group forms a complicated ternary compound similar to an approximate crystal which is a relative of a quasicrystal, and the ternary compound exhibits brittle properties similar to those of a quasicrystal. In addition, an Al alloy of the second group is changed into a quasicrystal when processed by liquid quenching. The TM element are almost immiscible with Cu in an alloy.

The immiscibility indicates that elements are immiscible with each other in a solid state. It is believed that this immiscibility plays an important role in the above alloy catalyst. That is, in leaching treatment with an aqueous alkaline solution, Al is only leached out, and the remaining Cu and the TM element each form its nanoparticles since being immiscible with each other. In addition, since being immiscible with a transition metal element, when Cu nanoparticles are surrounded by nanoparticles of the transition metal element, the Cu atoms cannot diffuse through the nanoparticles thereof. The effect described above is one reason the above alloy system exhibits a high catalytic activity even at a high temperature.

In the present invention, among Al alloy precursors used as a raw material for catalyst manufacturing, in particular, from a quasicrystalline Al alloy, fine primary particles having a large surface area can be easily obtained due to its own quasicrystalline brittleness. The quasicrystalline Al alloy has a regular decagonal (two dimensional) quasicrystalline structure that has no periodicity but has the ten-fold symmetry which is not present in crystals. Since the quasicrystals having these compositions have been known as a stable phase, the melting point reaches approximately 1,020° C. and the quasicrystalline structure can be maintained up to the melting point. Hence, when heat treatment is performed at a temperature of approximately 800° C., owing to the growth of the quasicrystalline phase, a "quasicrystal" formed of three elements can be obtained having a good single phase.

Since the quasicrystalline phase has no periodicity and no specific slip plane, plastic deformation caused by motion of dislocation is not likely to occur, and the quasicrystalline phase has brittle properties. When the quasicrystal is used as a catalyst, a large surface area thereof is required in order to obtain a sufficient activity; hence, the quasicrystal is required to have superior pulverization processability, to be easily pulverized into particles on the order of microns, and to form a large surface area.

The Al alloy used as the precursor of a heat resistant copper-based catalyst of the present invention is obtained in the form of an ingot by melting and casting pure metals in the above composition ratios using a common melt casting method such as arc melting. Furthermore, this ingot is processed by heat treatment at a temperature in the range of approximately 700 to 850° C. in a vacuum or an inert gas atmosphere to prevent the oxidation of the ingot, so that a uniform crystalline phase can be obtained.

According to a method for manufacturing a catalyst of the present invention, first, the ingot of the Al alloy thus obtained is pulverized to increase the surface area to be used as a catalyst. For pulverization, for example, the alloy obtained by pulverizing the ingot is charged in an agate mortar, and a planetary ball mill is used. In this step, the distribution of particle diameters of obtained particles is in the range of approximately 1 to 100 μm and preferably in the range of 5 to 50 μm.

A composite particle catalyst of the present invention is manufactured by performing leaching treatment for the particles thus obtained. A treatment liquid used for the leaching treatment has a basic property and is reactive with aluminum, and an aqueous alkaline solution is used which contains sodium hydroxide (NaOH), sodium carbonate ($Na_2CO_3$), sodium hydrogen carbonate ($NaHCO_3$), or the like; however, when leaching is performed by an aqueous NaOH solution at a high concentration which is generally used, since the leaching effect is excessively strong, it becomes difficult to form a catalyst layer in which Cu nanoparticles and nanoparticles of a transition metal element are uniformly dispersed. Hence, an aqueous sodium carbonate ($Na_2CO_3$) solution or an aqueous sodium hydrogen carbonate ($NaHCO_3$) solution, which has medium or weak basic property, is preferably used. When the concentration of an aqueous alkaline solution is high, a considerable amount of Al is leached out of the alloy particles; hence, it is not preferable since the ratio of fine particles which tightly adhere to the particle surfaces is excessively increased. The concentration of the aqueous alkaline solutions as described above is preferably in the range of approximately 2 to 15 percent by weight. When the concentration is less than 2 percent by weight, leaching cannot be sufficiently performed, and on the other hand, when the concentration is more than 15 percent by weight, the reaction rapidly proceeds, and hence it is not preferable since the control of leaching cannot be easily performed.

When an aqueous alkaline solution having a low concentration is used for the leaching treatment, a thin alumina film formed on the surface of the Al alloy particle is removed, and in addition, aluminum is leached out of a considerably thin layer under the surface of the alloy particle. The temperature for the leaching treatment may be in the range of 0 to 90° C., and since the leaching rate is increased and the specific surface area is also increased as the temperature is increased, the leaching is preferably performed at 40° C. or more. The amount of Al leached out by the leaching treatment using a low-concentration aqueous alkaline solution is preferably in the range of approximately 0.5 to 40 percent by weight. When the amount is less than 0.5 percent by weight, the leaching of Al is not sufficient and the surface area is small. On the other hand, when the amount is more than 40 percent by weight, it is not preferable since the quasicrystal structure is damaged, and the stability of the catalyst is degraded. The amount is more preferably in the range of 3 to 25 percent by weight.

By this leaching treatment, fine Cu particles (Cu nanoparticles) can be precipitated on the surface of the particle. By the leaching treatment, composite particles are obtained having the Cu nanoparticles and nanoparticles of a transition metal element, which are uniformly dispersed and are fixed onto the surfaces of the Al alloy particles. After the fine composite particles thus obtained are processed by filtration and are then sufficiently washed, drying is performed.

The specific surface area of the composite particles thus obtained is in the range of approximately 5 to 40 $m^2/g$. Since the size of the primary particles obtained by the leaching treatment is not substantially varied, the increase in surface area is resulting from the network-shaped fine structure formed on the surface of the Al alloy particle. As described above, by the leaching treatment using a low-concentration aqueous alkaline solution, a region from the surface of the Al alloy particle to a depth of approximately 200 nm therefrom is only leached, and the presence of a core of the Al alloy particle plays an important role in stability of the catalyst. Hence, although the surface area is not so significantly large as described above, a highly catalytic activity can be obtained.

The metal nanoparticles precipitated on the Al alloy particle are responsible for the catalytic activity, and the Al alloy particle functions as a carrier. In an AlCuFe quasicrystal, Fe is present in the form of nanoparticles of Fe or a Fe oxide. Since Fe and an oxide thereof are immiscible with Cu, a solid solution is not formed, and hence an effect of preventing sintering caused by diffusion of Cu atoms can be obtained.

When a Cu-based catalyst using the quasicrystalline Al alloy formed as described above is further calcinated in an oxidizing atmosphere such as in the air, the network-shaped oxide can be further stabilized, and a Cu-based catalyst having high activity and high heat resistance can be obtained. As the heating conditions in this step, it is preferable that the heating temperature be set to 300 to 700° C. and the heating time be set to 4 to 24 hours. Even when the heating temperature is increased to more than 700° C. or the heating is performed for more than 24 hours, the effect is not so much different. When the heating temperature is less than 300° C., and the heating time is less than 4 hours, a sufficient effect cannot be obtained. The catalyst thus obtained is composed of a wool-shaped structure of a nanoscale Al oxide and Cu nanoparticles which are highly dispersed therein. In this step, when oxidation is performed at a high temperature, such as 600° C. or more, a $Cu(TM_xAl_{1-x})_2O_4$ (0<x≦1.0) spinel compound is formed. Furthermore, when this compound is processed by reduction treatment in a hydrogen atmosphere at approximately 200 to 300° C., surface layers having a structure in which Cu nanoparticles having a particle diameter of 10 nm or less are surrounded by $Fe_3O_4$, $Al_2O_3$ or a mixture thereof are formed, and the catalytic activity is increased.

Whenever necessary, the composite particles of the present invention are molded and are then used as a catalyst. The composite particles may be supported by a carrier for the use. A type of reactor using the catalyst of the present invention is not particularly limited, a fixed bed flow reactor and a fluidized bed reactor may both be used, and the catalyst of the present invention can be used for a liquid phase reaction besides a vapor phase reaction.

EXAMPLES

Next, the present invention will be further described in detail with reference to the examples.

Example 1 and Comparative Example 1

Al—Cu-Fe quasicrystal/leaching treatment using $Na_2CO_3$ at a concentration of 5 percent by weight After 4.29 g of Al, 4.01 g of Cu, and 1.69 g of Fe were measured and were placed in a water-cooled copper hearth, arc melting was performed in an argon atmosphere, so that 10 g of an $Al_{63}Cu_{25}Fe_{12}$ ingot was obtained. This ingot was pulverized in an alumina pot into a powder having a size of 1 mm or less and was then vacuum sealed in a quartz tube, followed by heat treatment at 800° C. for 24 hours. After the heat treatment, the powder thus treated was recovered from the quartz tube, and pulverization was further performed using a satellite ball mill. The distribution of the diameters of the obtained particles was in the range of 0.1 to 100 μm.

The particles thus obtained were processed by leaching treatment at room temperature for 4 hours using an aqueous $Na_2CO_3$ (sodium carbonate) solution at a concentration of 5 percent by weight. After the powder thus treated was filtrated, washing was sufficiently performed with water, followed by drying. The amount obtained by leaching was approximately 4 percent by weight. By the steps described above, composite particles were obtained in which Cu nanoparticles are uniformly dispersed and tightly fixed to the surfaces of quasicrystalline Al alloy particles. The specific surface area was approximately 30 $m^2/g$. When being not further processed, the composite particles thus obtained were regarded as particles of Comparative Example 1. After this composite particles were charged in an alumina crucible and was further placed in an electric furnace, the temperature was increased to 600° C. at an increasing rate of 10° C. and was held at 600° C. for 24 hours in the air, followed by slow cooling, so that firing was performed.

The specific surface area of the particles thus obtained was 17 $m^2/g$. In FIG. 2, powder X-ray diffraction patterns of the catalyst according to the present invention are shown.

According to the powder X-ray diffraction of the sample before and after the reaction, no clear diffraction peaks of copper or a copper oxide were observed, and it is indicated that no sintering of Cu occurred. The particle diameter of Cu (CuO) estimated from the results of the powder X-ray was approximately 10 to 20 nm. In addition, in FIG. 3, an image of the catalyst particle of the present invention is shown, which was taken by a transmission electron microscope. For purpose of comparison, in FIG. 4, an image of the interface between the Al alloy particle and the oxide layer on the surface before calcinating treatment is shown, which was taken by a transmission electron microscope.

As can be seen from FIG. 3, it becomes apparent that the structure at the interface is considerably changed by calcinating. As shown in FIG. 4, before calcinating, a cotton candy-shaped Al oxide layer having a thickness of approximately 200 nm is located at a position very close to the surface of the quasicrystal, and in the above oxide layer, a great number of Cu nanoparticles are dispersed. This is the reason the quasicrystal has a large surface area and a high activity. However, by calcinating at 600° C., as shown in FIG. 3, between the surface of the quasicrystal and the cotton candy-shaped Al oxide layer, an integrated layer composed of $Al_2O_3$, CuO and oxide nanoparticles of Fe is newly formed. It is believed that the layered structure thus obtained confers high heat stability on the quasicrystalline catalyst.

<Catalytic Activity Test>

After 0.6 g of the catalyst obtained by the method described above was measured, a mixture of water and methanol at a molar ratio of 1.5 was allowed to flow through a fixed bed flow reactor in which a reaction temperature was set to 240 to 400° C. under atmospheric pressure. Gases generated therefrom were analyzed by a gas chromatographic method, and the evaluation of the catalytic activity was performed by the hydrogen generation rate. Before this evaluation of the catalyst, the obtained composite particles were reduced at 240° C. in a hydrogen atmosphere so the activity of the catalyst was maximally improved, followed by evaluation.

The results, that is, the hydrogen generation rates (black square marks), of the catalytic activity test of the composite particles thus obtained are shown in FIG. 5 together with the results (black circular marks) of Comparative Example 1 in which only the leaching treatment was performed. Owing to the firing in the air, the catalytic activity is significantly improved over the whole temperature range of 240 to 360° C., and the hydrogen generation rate is increased by 40% or more. The $H_2$ amount generated per gram, which indicates the activity, reaches a maximum value of 560 ml/min at 360° C. Furthermore, the hydrogen generation amount is being increased as the temperature is increased to 360° C., and as the Cu-based catalyst, a high heat resistance can be obtained. Since the hydrogen generation rate is increased even at a relatively high temperature, such as 360° C., it can be said that the high heat resistance is verified.

Example 2 and Comparative Example 2

Al—Cu—Co quasicrystal/leaching treatment using $Na_2CO_3$ at a concentration of 5 percent by weight After 4.514 g of Al, 2.453 g of Cu, and 3.033 g of Co were measured and were placed in a water-cooled copper hearth, arc melting was performed in an argon atmosphere, followed by cooling of the above mixture while it was still placed in the copper hearth, so that 10 g of an $Al_{65}Cu_{15}CO_{20}$ ingot was obtained. This ingot was pulverized in an alumina pot into a powder having a size of 1 mm or less and was then vacuum sealed in a quartz tube, followed by heat treatment at 800° C. for 24 hours. After the heat treatment, the powder thus treated was recovered from the quartz tube, and pulverization was further performed using a satellite ball mill. The distribution of the diameters of the particles thus obtained was in the range of 1 to 100 μm.

The Al—Cu—Co quasicrystalline alloy particles thus obtained were processed by leaching treatment at room temperature for 4 hours using an aqueous $Na_2CO_3$ solution at a concentration of 5 percent by weight. After the powder thus treated was filtrated, washing was sufficiently performed with water, followed by drying. The amount obtained by the leaching treatment was approximately 3.6 percent by weight. By the steps described above, composite particles were obtained in which Cu nanoparticles and Co nanoparticles were uniformly dispersed and tightly fixed to the surfaces of quasicrystalline Al alloy particles. The specific surface area was approximately 30 $m^2/g$. When being not further processed, the composite particles thus obtained were regarded as particles of Comparative Example 2.

After the above composite particles were charged in an alumina crucible and were further placed in an electric furnace, the temperature was increased to 600° C. at an increasing rate of 10° C. and was held at 600° C. for 24 hours in the air, followed by slow cooling, so that firing was performed. The specific surface area of the particles thus obtained was 15 $m^2/g$. From the results obtained by powder X-ray diffraction, the particle diameter of Cu (CuO) was estimated to be approximately 10 to 20 nm.

In a manner similar to that in Example 1, the catalytic activity test was performed. In FIG. 6, the catalytic activity test results, that is, the hydrogen generation rate (black square marks), of the composite particles thus obtained are shown together with the results of Comparative Example 2 (black circular marks) in which only the leaching treatment was performed. Owing to the calcinating in the air, the catalytic activity is further significantly improved over the entire temperature range of 240 to 360° C. as compared to that of the Al—Cu—Fe quasicrystalline alloy in Example 1, and the hydrogen generation-rate is increased by 40% or more. Since the hydrogen generation rate is increased even at a relatively high temperature, such as 360° C., it can be said that the high heat resistance is verified.

Example 3 and Comparative Example 3

Processes were performed in a manner similar to that in Example 1 and Comparative Example 1 except that as the leaching treatment solution, instead of the aqueous $Na_2CO_3$ solution at a concentration of 5 percent by weight used in Example 1 and Comparative Example 1, an aqueous NaOH solution at the same concentration as described above was used.

Example 4 and Comparative Example 4

Processes were performed in a manner similar to that in Example 3 and Comparative Example 3 except that as the Al alloy particles, instead of the $Al_{63}Cu_{25}Fe_{12}$ quasicrystal, $Al_{70}Cu_{20}Fe_{10}(\omega)$ phase alloy particles were used.

In FIG. 7, the catalytic activity test results, that is, the hydrogen generation rates (black square marks for Example 3, white circular marks for Example 4), of the composite particles obtained in Examples 3 and 4 are shown together with the results (black circular marks for Comparative Example 3, black triangle marks for Comparative Example 4) obtained only by the leaching treatment. Owing to the firing in the air, the catalytic activity is significantly improved over the entire temperature range of 240 to 360° C., and the hydrogen generation rate is increased by 40% or more. Since the hydrogen generation rate is increased even at a relatively high temperature, such as 360° C., it can be said that the high heat resistance is verified.

Example 5 and Comparative Example 5

Processes were performed in a manner similar to that in Example 1 and Comparative Example 1 except that as the leaching treatment solution, the aqueous $Na_2CO_3$ solution having a concentration of 5 percent by weight, which was used in Example 1 and Comparative Example 1), was heated to 50° C. In FIG. 8, the catalytic activity test results, that is, the hydrogen generation rates (black triangle marks for Example 5), of the composite particles thus obtained in Example 5 are shown together with the results (black square marks) of Example 1 and the results (black circular marks) of Comparative Example 1. Owing to the increase in temperature of the leaching treatment solution to 50° C., the catalytic activity is significantly improved. As shown in FIG. 8, the activity at 360° C. is more than 900 ml/g·minute. In particular, even at a low temperature, such as 240° C., a high catalytic activity, such as 200 ml/g·minute is obtained, and it is understood that besides a high activity at a high temperature, a high activity at a low temperature can also be obtained as compared to that of a common copper catalyst.

In FIG. 9, test results of catalyst life at 320° C. are shown which were obtained by using the samples of Example 5 and Comparative Example 5. According to the samples of Example 5 and Comparative Example 5, the catalytic activity tends to decrease with time; however, when the time is more than 50 hours, the rate of decrease in activity becomes considerably slow. According to the sample of Example 5, a high activity is maintained, and even after 50 hours, a high activity, such as 460 ml/g·minute, is maintained.

INDUSTRIAL APPLICABILITY

Since having superior heat resistance and durability besides a significantly high activity as compared to that of a conventional catalyst, the catalyst according to the present invention may be very effectively used as a copper-based catalyst used for manufacturing hydrogen by steam reforming of methanol.

Figure 1A:
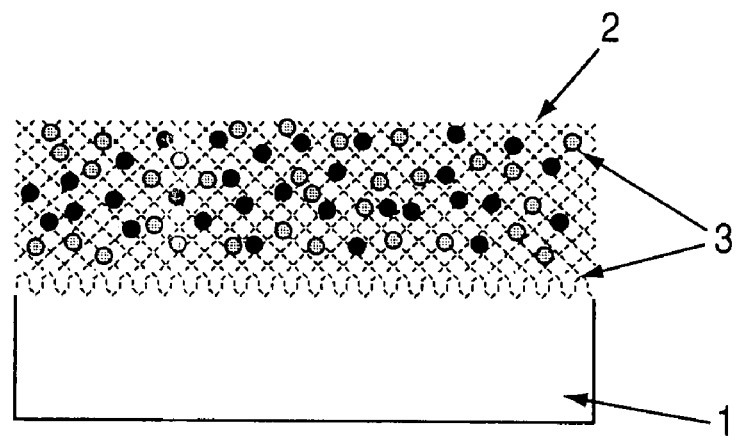
FIG. 1 includes conceptual views each showing a surface structure of a catalyst particle in a process for manufacturing a catalyst of the present invention.
Figure 1B:
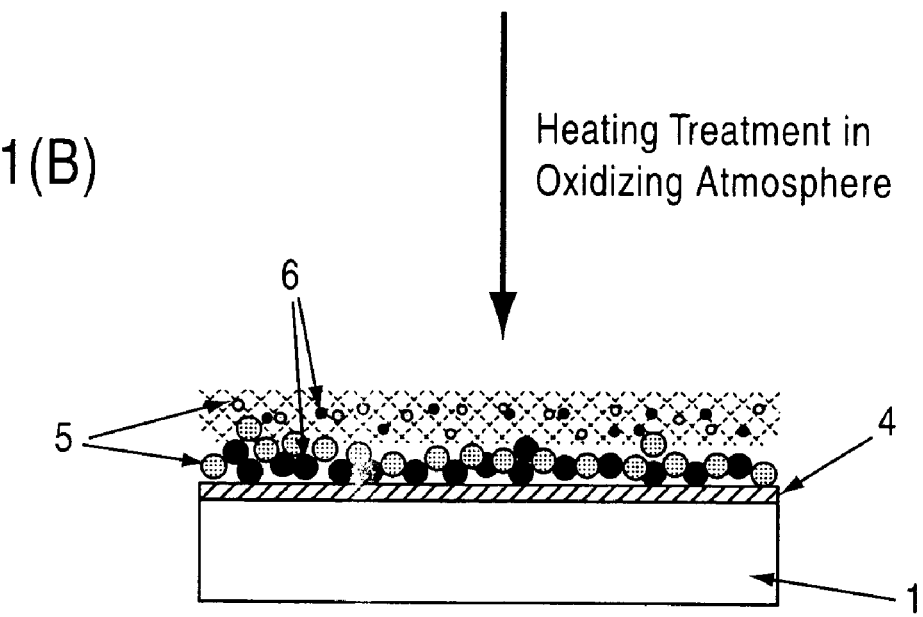
Figure 2:
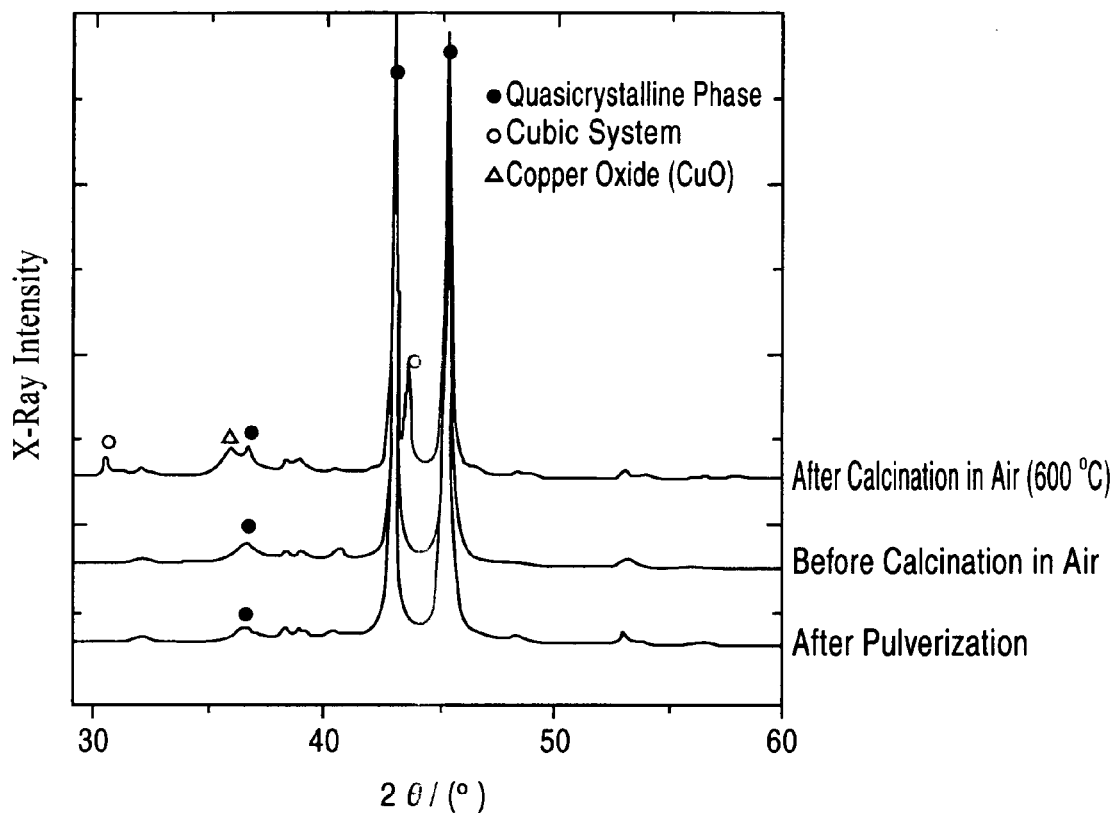
FIG. 2 is a graph showing powder X-ray diffraction patterns of catalyst particles obtained in Example 1 of the present invention.
Figure 3:
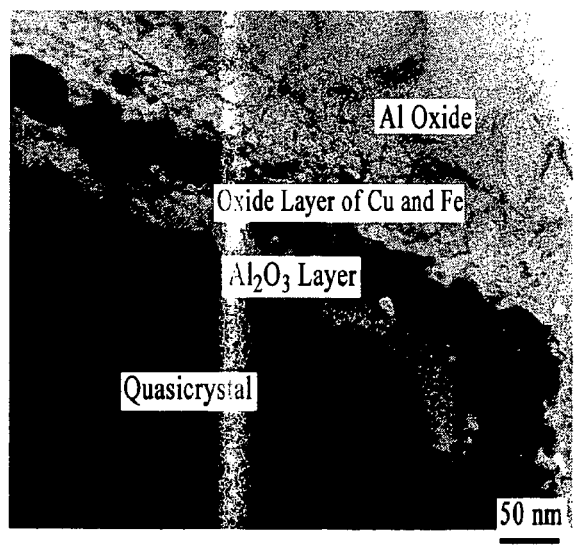
FIG. 3 is a photograph of an electron microscopic image of a catalyst particle obtained in Example 1 of the present invention.
Figure 4:
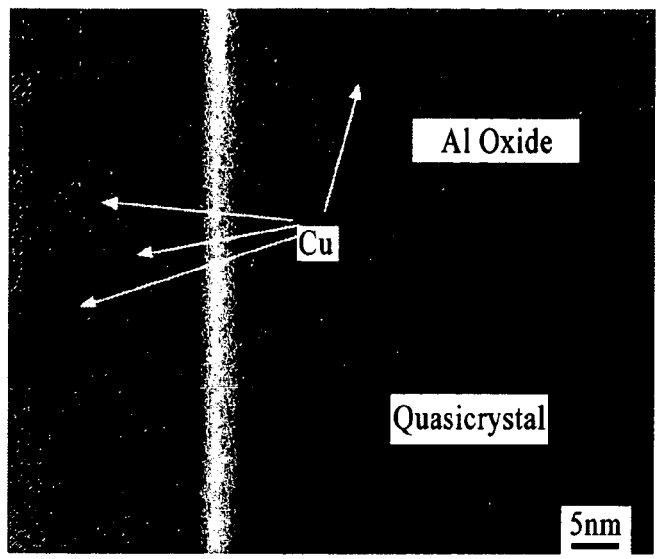
FIG. 4 is a photograph of an electron microscopic image of a catalyst particle before heat treatment is performed in an oxidizing atmosphere in Example 1 of the present invention.
Figure 5:
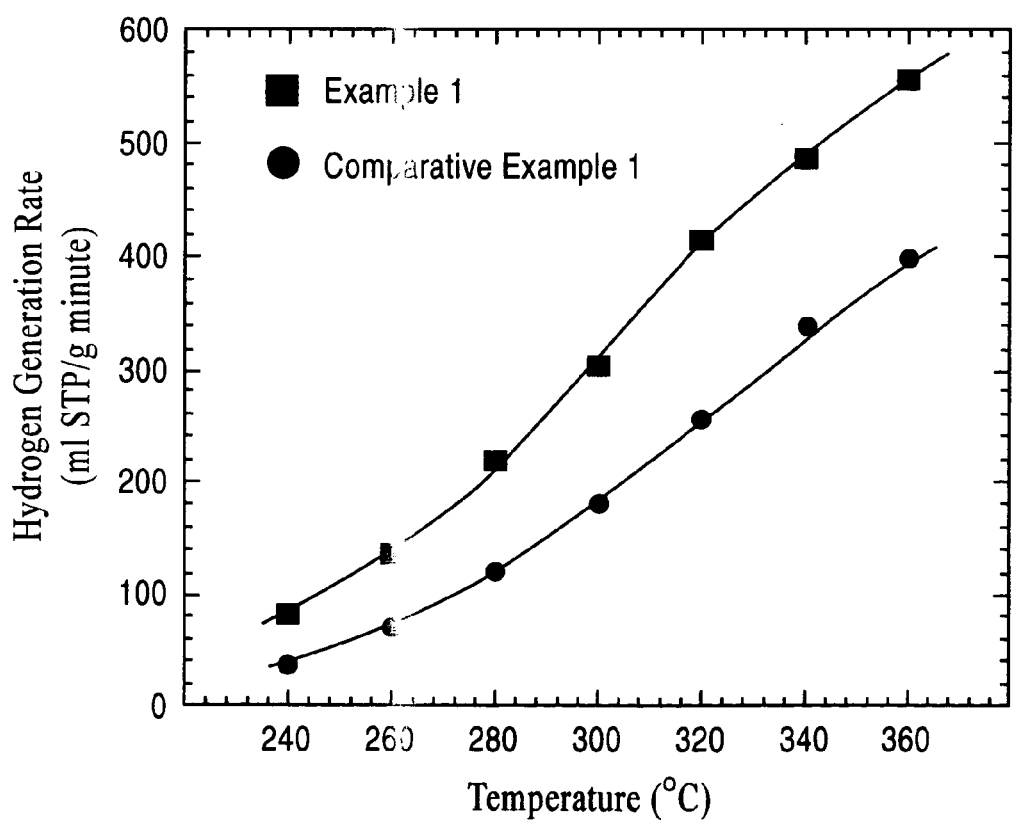
FIG. 5 is a graph showing the results of a catalytic activity test of Example 1 and Comparative Example 1.
Figure 6:
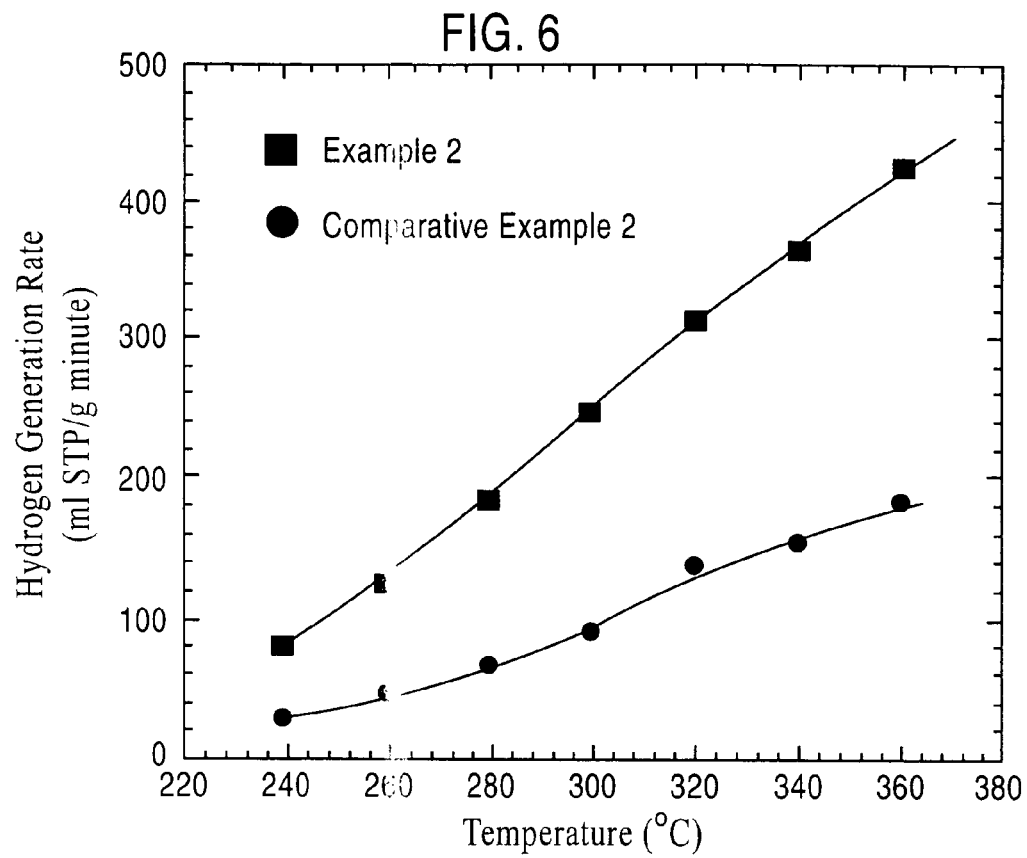
FIG. 6 is a graph showing the results of a catalytic activity test of Example 2 and Comparative Example 2.
Figure 7:
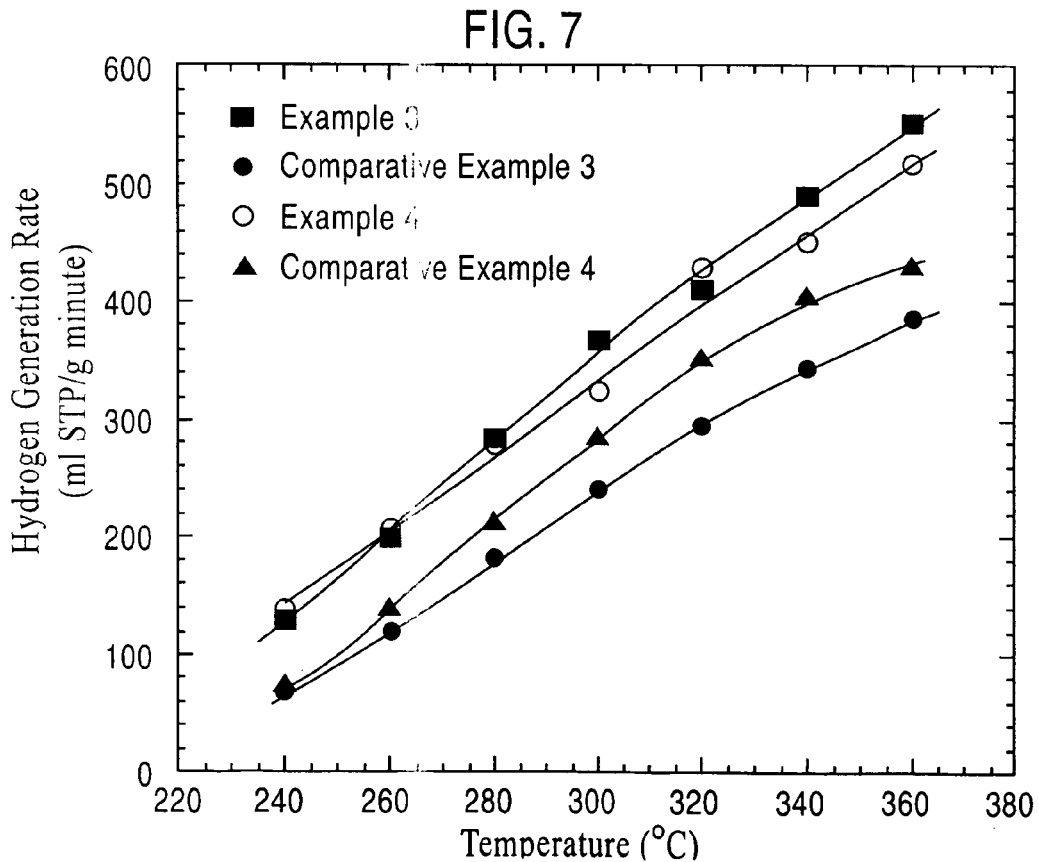
FIG. 7 is a graph showing the results of a catalytic activity test of Examples 3 and 4 and Comparative Example 3 and 4.
Figure 8:
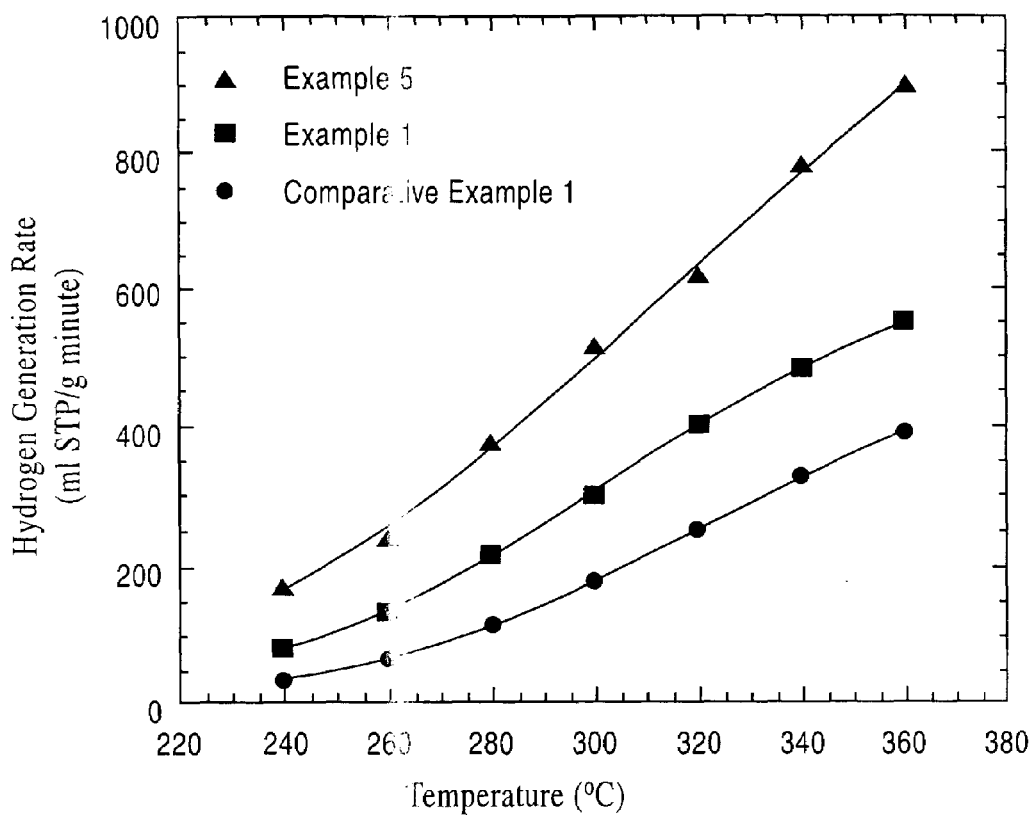
FIG. 8 is a graph showing the results of a catalytic activity test of Example 5, Example 1, and Comparative Example 1.
Figure 9:
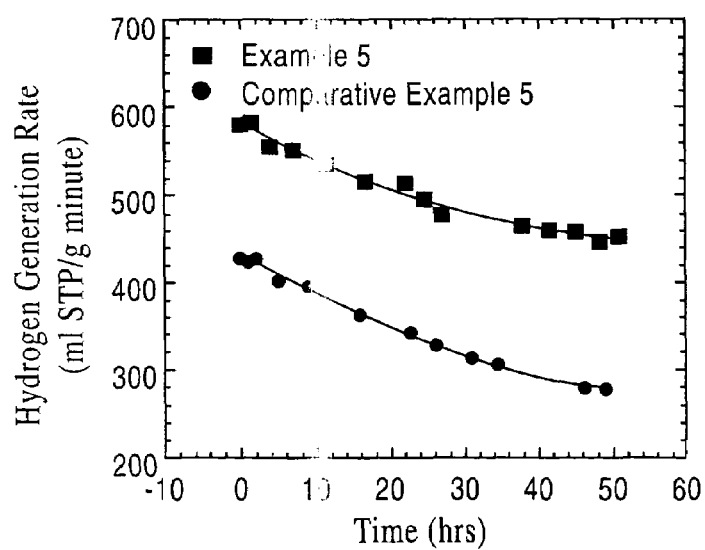
FIG. 9 is a graph showing the results of a catalytic activity life test of Example 5 and Comparative Example 5.

The invention claimed is:

1. A method for manufacturing a catalyst used for steam reforming of methanol: comprising the steps of pulverizing a bulky Al alloy having a quasicrystalline phase or a related crystalline phase thereof, the quasicrystalline phase being represented by the formula: $Al_{100-y-z}Cu_yTM_z$, where y is in the range of 10 to 30 atomic percent, z is in the range of 5 to 20 atomic percent, and TM indicates at least one of transition metals other than Cu, thereby obtaining Al alloy particles; and performing leaching treatment for the Al alloy particles with an aqueous alkaline solution containing one of sodium hydroxide (NaOH), sodium carbonate ($Na_2CO_3$), and sodium hydrogen carbonate ($NaHCO_3$), wherein the concentration and the temperature thereof are adjusted in the range of 2 to 15 percent by weight and in the range of 0 to 90° C. respectively, to form oxide surface layers, which contain fine Cu particles dispersed therein and which are composed of an Al oxide and a transition metal oxide, on surfaces of the Al alloy particles; and performing heat treatment of the leached Al alloy particles in an oxidizing atmosphere so that substantially all of the fine Cu particles are converted into fine copper oxide particles, whereby the catalyst used for steam reforming of methanol is manufactured so as to have Al alloy particles provided with oxide surface layers containing the fine copper oxide particles.

2. The method for manufacturing a catalyst according to claim 1, wherein the copper oxide in the surface oxide layers obtained by the heat treatment in an oxidizing atmosphere after the leaching treatment is CuO or a $Cu(TM_xAl_{1-x})_2O_4$ spinel compound, where $0<x\leq1.0$.

3. The method for manufacturing a catalyst according to claim 1, wherein the temperature of the aqueous alkaline solution is in the range of 40 to 90° C.

4. The method for manufacturing a catalyst according to claim 1, wherein an amount leached out of the Al alloy particles by the leaching treatment using the aqueous alkaline solution is in the range of 0.5 to 40 percent by weight.

* * * * *